(12) United States Patent
Ellement

(10) Patent No.: US 10,676,896 B2
(45) Date of Patent: Jun. 9, 2020

(54) SWING TYPE ACCESS SYSTEM FOR AN EARTH MOVER

(71) Applicant: Barjoh Pty Ltd, Oakford, WA (US)

(72) Inventor: Nathan Ellement, Armadale (AU)

(73) Assignee: Barjoh Pty Ltd, Oakford (AU)

( * ) Notice: Subject to any disclaimer, the term of this patent is extended or adjusted under 35 U.S.C. 154(b) by 0 days.

(21) Appl. No.: 15/027,250

(22) PCT Filed: Oct. 6, 2014

(86) PCT No.: PCT/AU2014/050269
§ 371 (c)(1),
(2) Date: Apr. 5, 2016

(87) PCT Pub. No.: WO2015/051409
PCT Pub. Date: Apr. 16, 2015

(65) Prior Publication Data
US 2016/0244944 A1    Aug. 25, 2016

(30) Foreign Application Priority Data
Oct. 8, 2013 (AU) .............................. 2013903877

(51) Int. Cl.
| | |
|---|---|
| *E06C 5/04* | (2006.01) |
| *E02F 9/08* | (2006.01) |
| *E06C 5/22* | (2006.01) |
| *E06C 5/24* | (2006.01) |
| *B60R 3/02* | (2006.01) |
| *E06C 5/02* | (2006.01) |
| *E06C 5/32* | (2006.01) |

(52) U.S. Cl.
CPC .............. *E02F 9/0833* (2013.01); *B60R 3/02* (2013.01); *E06C 5/02* (2013.01); *E06C 5/04* (2013.01); *E06C 5/22* (2013.01); *E06C 5/24* (2013.01); *E06C 5/32* (2013.01)

(58) Field of Classification Search
CPC .............. E06C 5/30; E02F 9/0833; B60R 3/02
USPC .......................................... 182/127
See application file for complete search history.

(56) References Cited

U.S. PATENT DOCUMENTS 4,159,122 A * 6/1979 Stevens ...................... B60R 3/02
108/134
4,236,601 A * 12/1980 Naka ...................... E06C 1/381
182/100

(Continued)

FOREIGN PATENT DOCUMENTS

| AU | 2012321863 A1 | 11/2013 | |
| WO | WO-2007062464 A1 * | 6/2007 | ............... B60R 3/02 |
| WO | 2013054777 A1 | 4/2013 | |

*Primary Examiner* — Daniel P Cahn
(74) *Attorney, Agent, or Firm* — Charles H. Jew

(57) ABSTRACT

An access system (10) for an earth moving equipment (100) to allow a person to travel from ground level to an elevated position, said access system (10) includes an access means (12) mountable on to the earth moving equipment (100), and a retraction mechanism (50) to move the access means (10) between a deployed position (14) wherein a person can ascend or descend on the access means and a retracted position (16) wherein the access means (10) is stowed, and a locking means (52) moveable to an operative position wherein the locking means (52) restrains movement of the access means (10) in the retracted position (16).

26 Claims, 8 Drawing Sheets

(56) References Cited

U.S. PATENT DOCUMENTS

| | | | | |
|---|---|---|---|---|
| 4,623,160 A * | 11/1986 | Trudell | ...................... | B60R 3/02 |
| | | | | 182/127 |
| 4,811,983 A * | 3/1989 | Watts | ........................ | E02F 9/00 |
| | | | | 180/89.14 |
| 5,154,125 A * | 10/1992 | Renner | ...................... | B60R 3/02 |
| | | | | 105/349 |
| 5,547,040 A * | 8/1996 | Hanser | ...................... | B60R 3/02 |
| | | | | 182/127 |
| 6,068,277 A * | 5/2000 | Magnussen | ............... | B60R 3/02 |
| | | | | 182/127 |
| 8,881,867 B2 * | 11/2014 | Takenawa | ............. | E02F 9/0833 |
| | | | | 182/127 |
| 8,919,497 B2 * | 12/2014 | Rund | ...................... | B60R 3/02 |
| | | | | 182/127 |
| 9,447,638 B2 * | 9/2016 | Hedley | ................... | E06C 1/393 |
| 2003/0173153 A1 * | 9/2003 | Hedley | ................... | B63B 27/14 |
| | | | | 182/97 |
| 2006/0011416 A1 * | 1/2006 | Gonzalez y Gil | ........ | B60R 3/02 |
| | | | | 182/127 |
| 2006/0070804 A1 * | 4/2006 | Lapke | ....................... | B60R 3/02 |
| | | | | 182/127 |
| 2009/0038885 A1 * | 2/2009 | Ellement | ................... | B60R 3/02 |
| | | | | 182/97 |
| 2009/0065301 A1 * | 3/2009 | Ellement | ................... | B60R 3/02 |
| | | | | 182/127 |
| 2013/0048400 A1 * | 2/2013 | Holdener | ................... | B60R 3/02 |
| | | | | 180/89.1 |
| 2013/0092474 A1 * | 4/2013 | Magnussen | ................ | E06C 5/04 |
| | | | | 182/127 |
| 2013/0193667 A1 * | 8/2013 | Ellement | ................... | B60R 3/02 |
| | | | | 280/166 |
| 2016/0101738 A1 * | 4/2016 | Iotti | ........................ | E06C 5/04 |
| | | | | 182/207 |
| 2017/0022759 A1 * | 1/2017 | Junghans | ................... | E06C 5/04 |
| 2019/0323292 A1 * | 10/2019 | Ziaylek | ................... | E06C 5/24 |

* cited by examiner

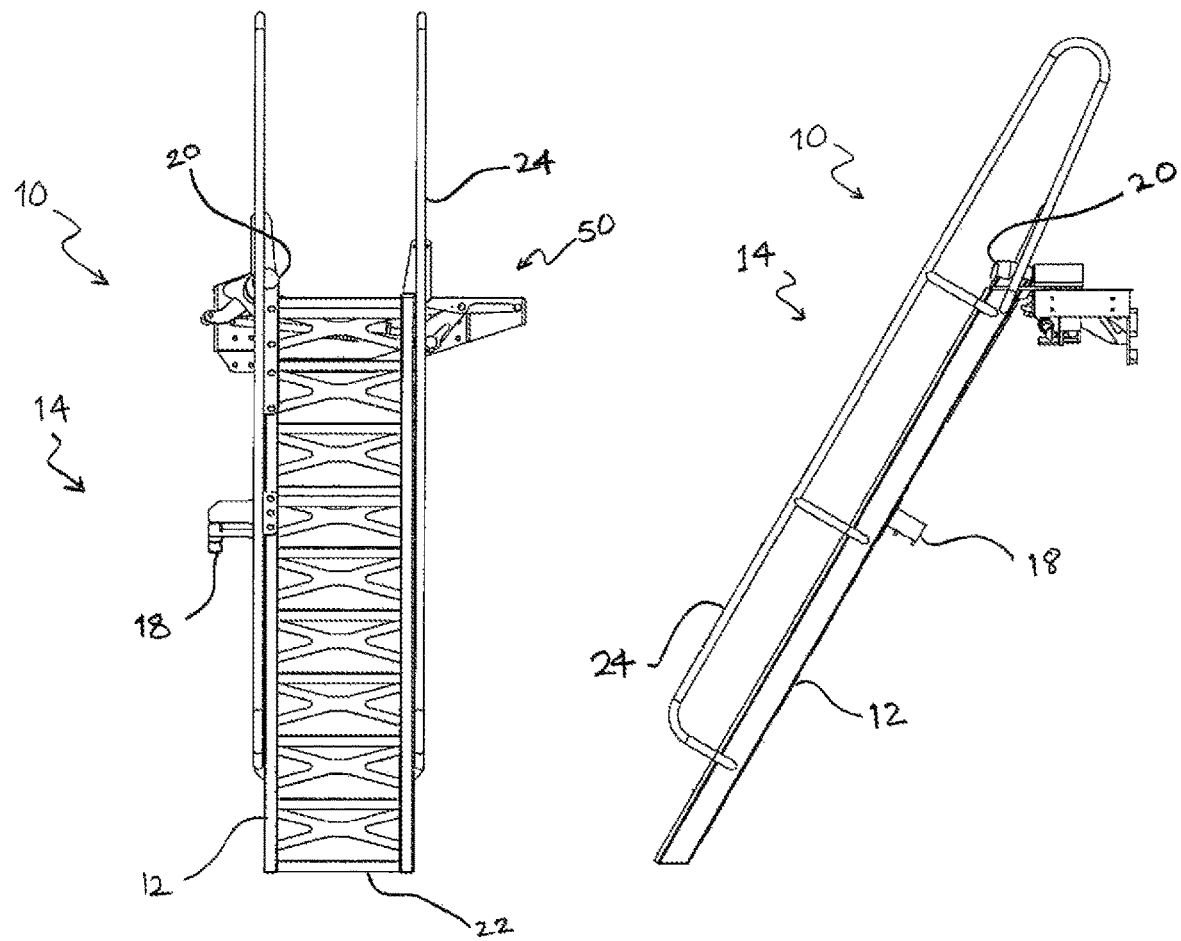
Figure 1A
Figure 1B
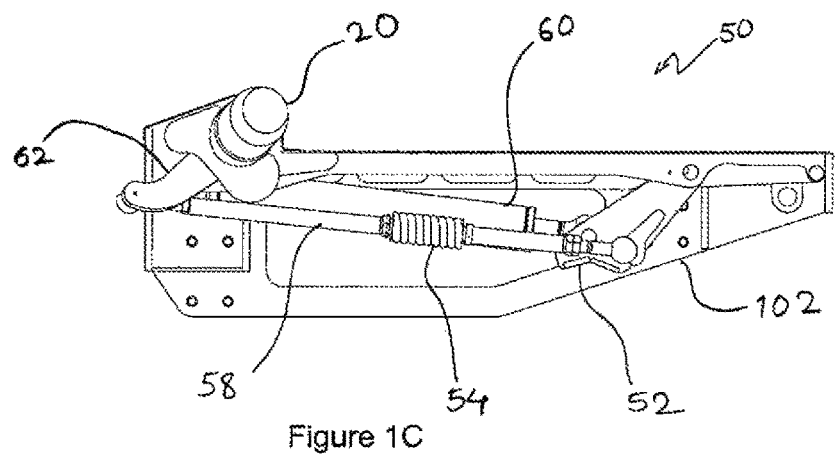
Figure 1C

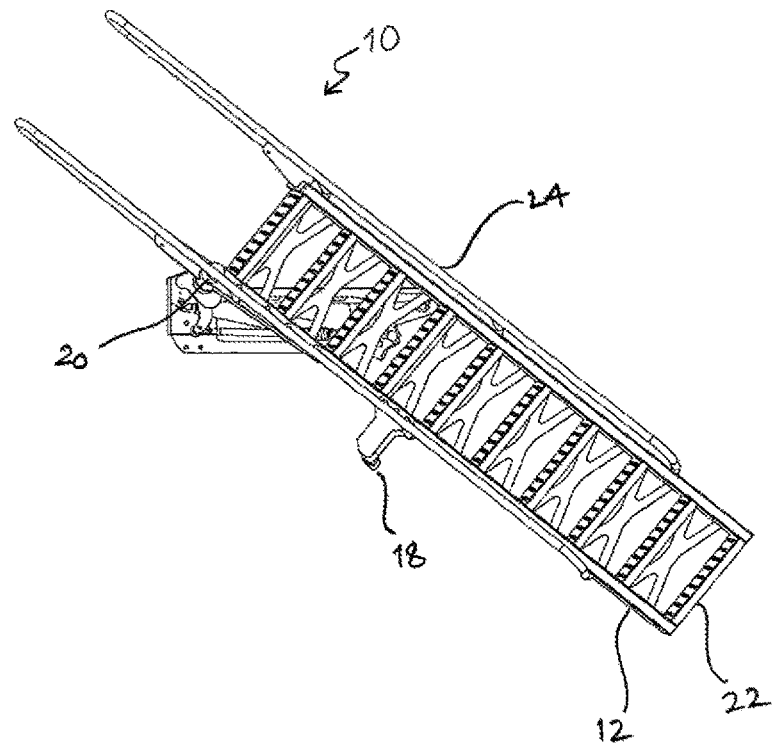
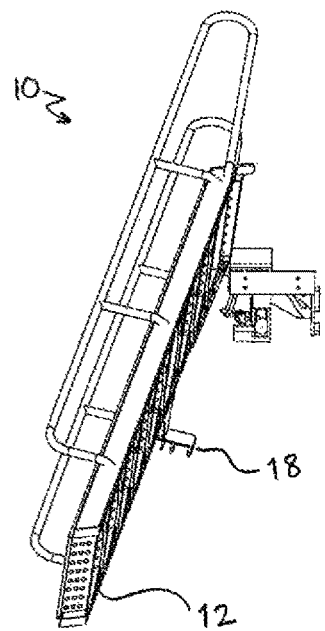
Figure 2A
Figure 2B
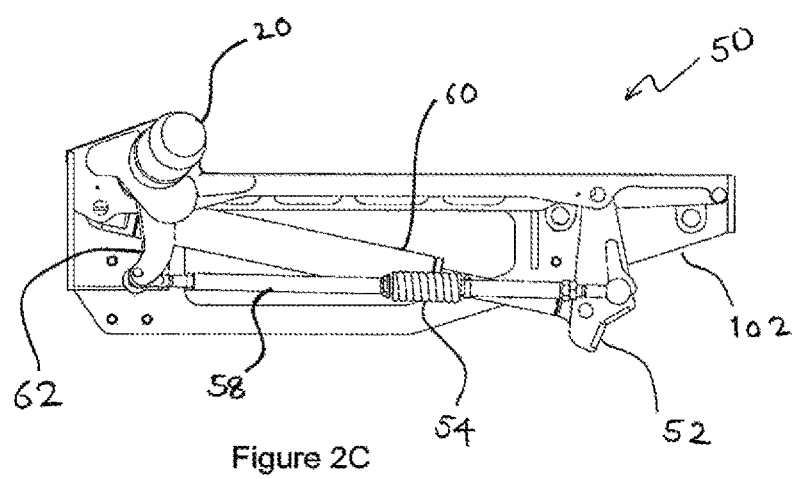
Figure 2C

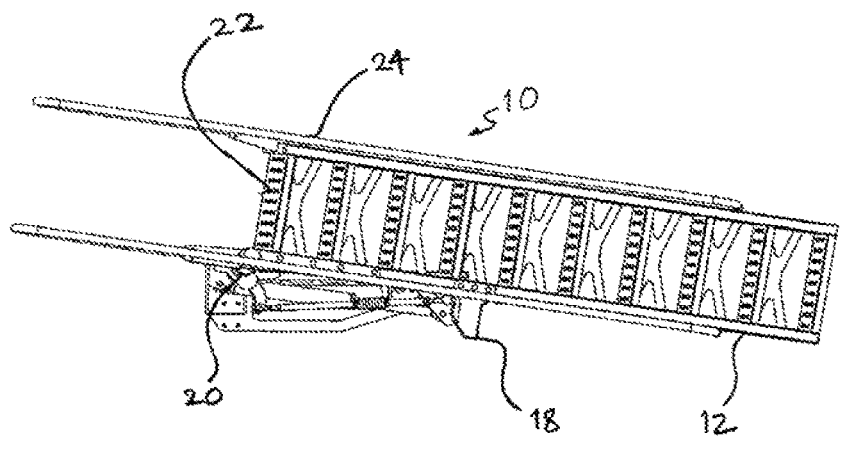
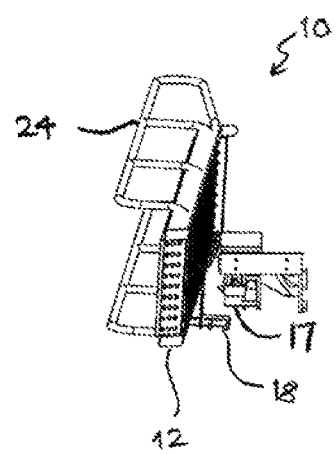
Figure 3A
Figure 3B
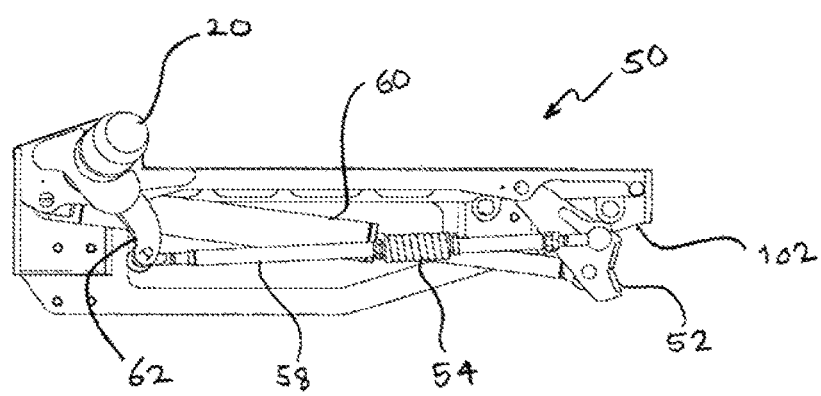
Figure 3C

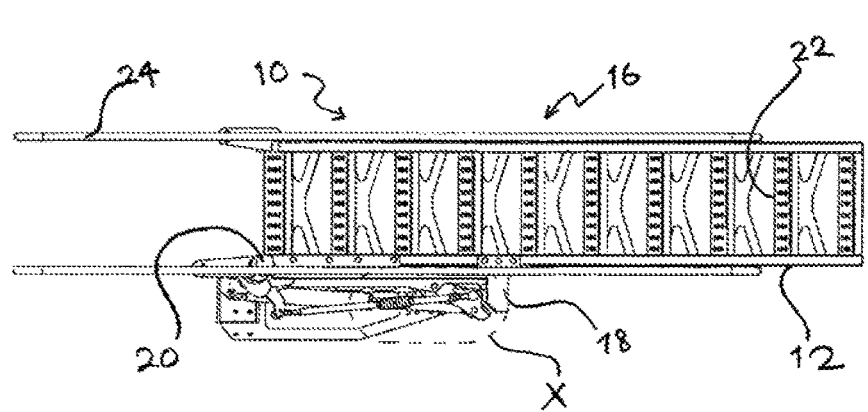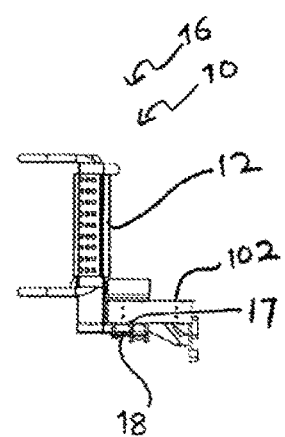
Figure 4A
Figure 4B
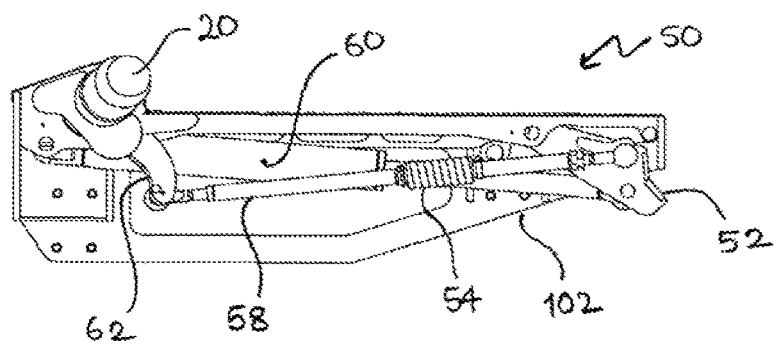
Figure 4C
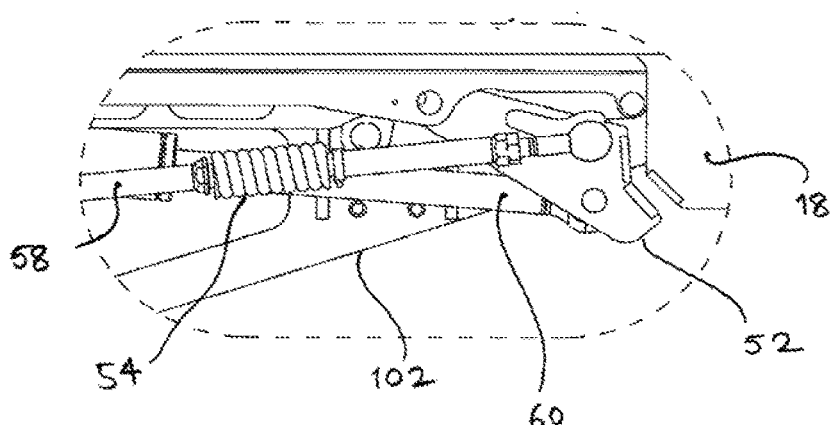
Detail X
Figure 4D

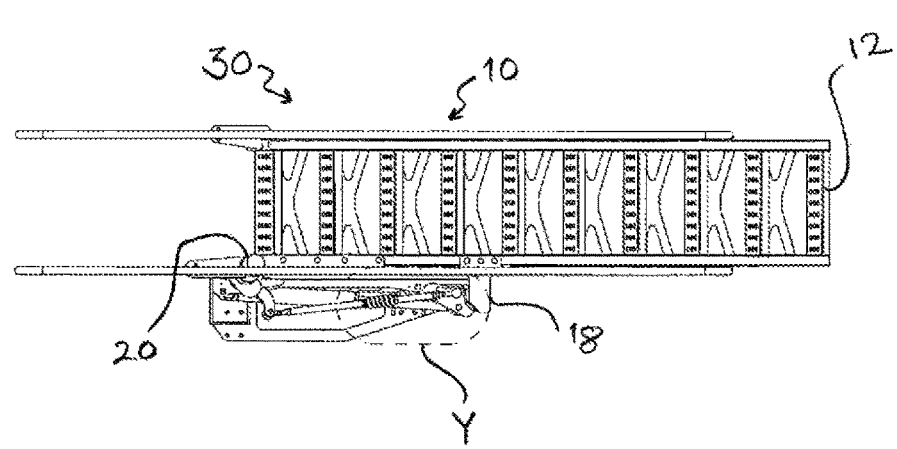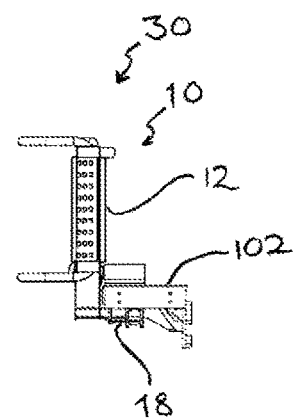
Figure 5A
Figure 5B
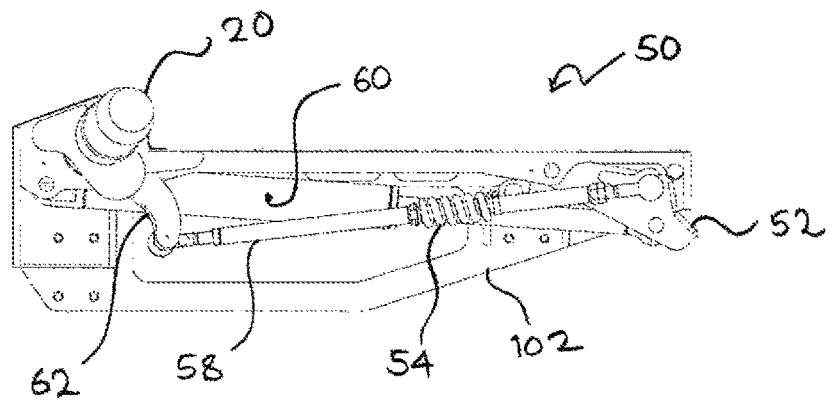
Figure 5C
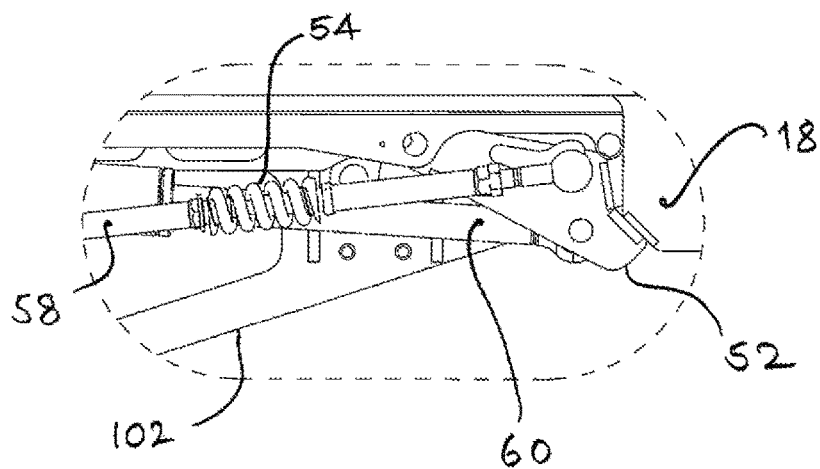
Detail Y
Figure 5D

SWING TYPE ACCESS SYSTEM FOR AN EARTH MOVER

FIELD OF THE INVENTION

The present invention relates to access systems for earth moving equipment and in particular to moveable or retractable access systems.

BACKGROUND TO THE INVENTION

Most earth moving equipment vehicles such as bulldozers generally include a chassis, a form of earth working tooling, driver cabin, and a form of access or access system. The chassis includes all the mechanical parts that form the structural frame of the earth moving equipment vehicle. The driver operates the earth moving equipment vehicle from the driver cabin. The access system provides access between the ground level and the cabin.

Retractable access systems of different configurations are presently known and have two final positions namely the deployed position and the retracted position. The major types of access devices are the vertical variable height access system and the swing access system.

The vertical variable height access system would generally be used for large excavators and large earth moving equipment. In the vertical variable height access system, the ladder or stairs would be operated vertically and would remain vertical both in the deployed position and retracted position.

In a swing access system the ladder or stairs when operated will swing up or down to reach either the retracted position or deployed position respectively. The basic constituents of any access system include a ladder or stairs and a retraction mechanism to actuate the ladder or stairs. The ladder is generally pivoted on one or two points on the earth moving equipment. The retraction mechanism moves the ladder or stairs between the deployed position and the retracted position. The retraction mechanism is usually actuated by mechanical means, electrical means or hydraulic means.

When in use, the earth moving equipment travels over rough surfaces. Such travel over rough surfaces causes shocks and vibrations to the chassis of the earth moving equipment. These shocks and vibrations are transferred to all on-board components including the access system.

For safety reasons, the ladder of a swing access system is retracted before the earth moving equipment is set in motion. Due to the shocks and vibrations acting on the ladder, the ladder experiences "bounce" i.e. sudden jerky movements. The bounce is amplified at the unattached end of the ladder due to the overhang of the ladder. The bounce is undesirable because it damages the pivot joints of the ladder to the earth moving equipment, any item that the bouncing ladder comes in contact with, and the ladder itself. Prolonged bouncing movement could lead to failure of certain components which are adversely affected by the bounce. The bounce also creates noise which may distract the driver/operator of the earthmoving equipment.

It is an object of the present invention to reduce 'bounce' of a retracted ladder of an access system when the earth moving equipment is travelling.

SUMMARY OF THE INVENTION

With the aforementioned problems in mind, an aspect of the present invention provides an access system for an earth moving equipment to allow a person to travel from ground level to an elevated position, said access system including:
  an access means mountable on to the earth moving equipment, and
  a retraction mechanism to move the access means between a deployed position wherein a person can ascend or descend on the access means and a retracted position wherein the access means is stowed, and
  a locking means moveable to an operative position wherein the locking means restrains movement of the access means in the retracted position.

The locking means may restrain movement of the access means in a direction towards the deployed position.

The locking means is moveable to an inoperative position so that the access means in the retracted position is moveable in a direction towards the deployed position.

In the operative position, the locking means restrains the movement of the access means whereby the access means is restricted or prevented from moving freely when shocks and vibrations from the rough surface are transferred to the access means. The restraint limits, reduces or prevents the 'bounce' of the access means when the vehicle is moving. Such 'bounce' can otherwise cause damage to the pivot and any associated bearings through repeated up an down motion 'bounce' shocks caused by the access means bouncing as the vehicle travels over the uneven ground. Such limitation on the bounce aims to prevent or at least reduce the damage to the pivot joint(s) of the access means, to the earth moving equipment, components of the retraction mechanism, and the ladder.

The locking means may be included in the retraction mechanism, whereby number of components is reduced.

The locking means may engage with the access means in order to restrain movement of the access means.

The access system may include an extendible linkage element, wherein the linkage element extends in order to allow the locking means to move to the operative position.

The access system may further include a biasing means acting to restrain extension of the linkage element when the locking means is in the inoperative position.

The extendible linkage element preferably remains in a contracted state during retraction of the access means because the biasing means acts to contract the extendible linkage element by holding portions of the extendible linkage element together relative to one another.

When the access device is retracted against a stop, an actuator (such as a hydraulic ram or electric or pneumatic drive means) can move the locking means to physically restrain the access device and at the same time the actuator has enough force to extend the biasing means and the extendible linkage element because of the extra length needed in the extendible linkage element to complete that stroke. The actuator does this against a force from the biasing means trying to maintain the extendible linkage element at a shorter retracted length.

The biasing means may be integrated with the retraction mechanism. The biasing means ensures that the linkage element returns to a shorter length and locking means is moved to the inoperative position when force of the actuator is removed. Therefore, the biasing means ensures that the locking means disengages from the access means.

The locking means may include a rotatable arm connected via the linkage element to a pivot arm attached to the access means such that rotating the rotatable arm moves the access means between the deployed position and the retracted position.

Preferably, the linkage element extends when the locking means moves to the operative position when the rotatable arm is further rotated after the access means reaches the retracted position.

As a corollary, the movement of the access means is not restrained by the locking means unless the linkage element is extended in order to locate the locking means to the operative position.

The rotatable arm may be rotated by an actuator, such as a hydraulic ram, pneumatic means or electric drive.

The access means may include a stop member attached to the access means, wherein the stop member engages with a fixed member mounted on the earth moving equipment when the access means is moved to the retracted position in order to prevent movement of the access means.

With the locking means and the stop member restricting movement of the access means in opposite directions, the scope of movement of the access means due to shocks and vibrations is restricted. Thereby bounce of the ladder is further reduced.

The access means may be a ladder or stairs.

A further aspect of the present invention provides an earth moving equipment including an access system according to the aforementioned aspect of the present invention.

A further aspect of the present invention provides a retraction mechanism for an access means for an earth moving equipment, the retraction mechanism capable of moving the access means between a deployed position wherein a person can ascend or descend on the access means and a retracted position wherein the access means is stowed, the retraction mechanism including:

a locking means moveable to an operative position wherein the locking means restrains movement of the access means in the retracted position.

Preferably, the locking means restrains movement in a direction towards the deployed position.

Preferably, the locking means is moveable to an inoperative position so that the access means in the retracted position is moveable in a direction towards the deployed position.

A further aspect of the present invention provides a locking means for selectively restraining movement of an access means mountable on to an earth moving equipment, wherein the locking means moveable to an operative position wherein the locking means restrains movement of the access means in the retracted position.

Preferably, the locking means restrains movement of the access means in a direction towards a deployed position.

Further preferably, the locking means is moveable to an inoperative position so that the access means in the retracted position is moveable in a direction towards the deployed position.

A further aspect of the present invention provides a method for securing an access means mounted on an earth moving equipment, the access means moveable between a deployed position wherein a person can ascend or descend on the access means and a retracted position wherein the access means is stowed, the method including the steps of:

moving the access means to the retracted position, restraining movement of the access means in the retracted position by a locking means.

A method may include a further step of restraining movement of the access means by the locking means in a direction towards the deployed position.

A method may include a further step of engaging the locking means with the access means in order to restrain movement of the access means.

A method may include a further step of extending an extendible linkage element attached to the locking means to enable the locking means to move to the operative position.

A method may include a further step of restraining extension of the linkage element in the inoperative position of the locking means by a biasing means acting against extension of the linkage element.

A method may include a further step of rotating the locking means connected via the linkage element to a pivot arm attached to the access means in order to move the access means between the deployed position and the retracted position.

A method may include a further step of extending the linkage element to allow the locking means to move to the operative position when the locking means is further rotated, preferably after the access means reaches a retracted position.

A method may include a further step of rotating the locking means by an actuator.

A method may include a further step of preventing movement of the access means by engagement a stop member attached to the access means with a fixed member mounted on the earth moving equipment when the access means is in the retracted position.

BRIEF DESCRIPTION OF THE DRAWINGS

FIGS. 1A to 5A are progressive illustrations showing front view of an access system according to one embodiment of the present invention being moved from a deployed position to a retracted position.

FIGS. 1B to 5B are progressive illustrations showing side view of an access system according to one embodiment of the present invention being moved from a deployed position to a retracted position. FIGS. 1B to 5B correspond to the progressions of the access system of FIG. 1A to 5A.

FIG. 1C to 5C are also progressive illustrations showing a retraction mechanism of an access system according to one embodiment of the present invention. FIGS. 1C to 5C correspond to the progressions of the access system of FIGS. 1A to 5A.

FIG. 4D is an enlarged view of detail X of FIG. 4A.

FIG. 5D is an enlarged view of detail Y of FIG. 5A.

DESCRIPTION OF PREFERRED EMBODIMENT

Figure 6A:
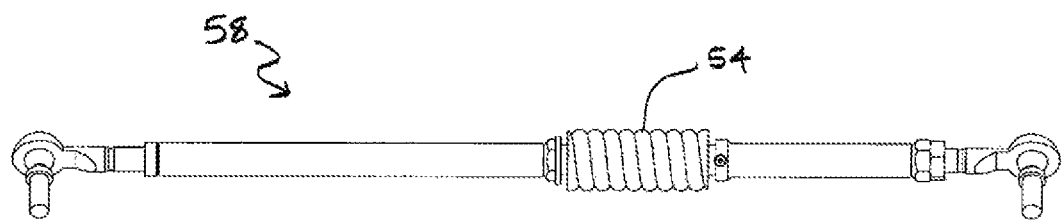
FIG. 6A illustrates a linkage element in a contracted state according to one embodiment of the present invention.

Referring to FIGS. 1A to 5B, an access system 10 for an earth moving equipment 100 to allow a person to travel from ground level to an elevated position includes: an access means 12 mounted on to the earth moving equipment 100, a retraction mechanism 50 and a locking means 52.

Referring to FIGS. 1A to 5A, the access means 12 is a ladder having a plurality of steps 22 for a person to climb up and down the ladder 12. The ladder 12 has handrails 24 on either side for holding on to, so that a person travelling on the ladder 12 can do so safely.

Referring to FIGS. 1B to 5B, a stop member 18 is attached to the ladder 12 such that the stop member 18 is a part of the ladder 12 protruding from the ladder 12. The stop member 18 is an L-shaped component. One end of the stop member 18 is attached to the ladder 12, and the other end of the stop member 12 projects towards a mount 102 on the earth moving equipment 100.

The ladder 12 is mounted on a pivot 20. The ladder 12 is rotated about a pivot 20 in order to move the ladder 12 between a deployed position 14 wherein a person can travel on the access means 10 and a retracted position 16 wherein the access means 10 is stowed. In the deployed position 14 the ladder 12 is vertical or inclined towards the earth moving equipment 100, whereas in the retracted position 16, the ladder 12 is substantially in line or horizontal with the earth moving equipment 100.

Referring to FIGS. 1C to 5C, the retraction mechanism 50 rotates the pivot 20 in order to move the ladder 12 between the deployed position 14 and the retracted position 16. The retraction mechanism 50 includes a hydraulic ram 60 as a prime mover to operate the retraction mechanism 50. At an end nearer to the pivot 20, the hydraulic ram 60 is mounted onto the earthmoving equipment 100 or on a mount 102 attached to the earth moving equipment 100. The other end of the hydraulic ram 60 is attached to a rotatable arm 52 at a distance offset from the pivot point of the rotatable arm. The rotatable arm 52 is pivotable at the pivot point on the mount 102 by actuation of the hydraulic ram 60. One end of an extendible linkage element 58 having a biasing means 54 is attached to the rotatable arm 52 at a point offset from the pivot of the rotatable arm 52. The other end of the linkage element 58 is attached to a pivot arm 62 at a point offset from the pivot of the pivot arm 62. The pivot arm 62 is connected to the pivot 20 such that rotating the pivot arm 62 rotates the pivot 20. The pivot 20 is connected to the ladder 12.

In order to move the ladder 12 from the deployed position 14 to the retracted position 16, the retraction mechanism 50 is operated. In particular, the hydraulic ram 60 is extended to rotate the rotatable arm 52 in one of a clockwise or counter-clockwise direction looking at the vehicle, whereby the linkage element 58 is pulled in a direction away from the pivot 20 and therefore the pivot arm 62 is also rotated in an counter-clockwise direction. The actual direction of rotation depends upon the vehicle and how/where the access device and the retraction mechanism are installed on the vehicle. The movement of the pivot arm 62 causes the pivot 20 to rotate, whereby the ladder 12 connected to the pivot 20 is moved from the deployed position 14 towards the retracted position 16.

In order to move the ladder 12 from the retracted position 16 to the deployed position 14, the retraction mechanism 50 is operated in reverse. The hydraulic ram 60 is contracted to rotate the rotatable arm 52 in a clockwise direction, whereby the linkage element 58 is pushed in a direction towards the pivot 20, and therefore the pivot arm 62 is rotated in a clockwise direction. The movement of the pivot arm 62 causes the pivot 20 to rotate, whereby the ladder 12 is moved from the retracted position 16 to the deployed position 14.

Figure 6B:
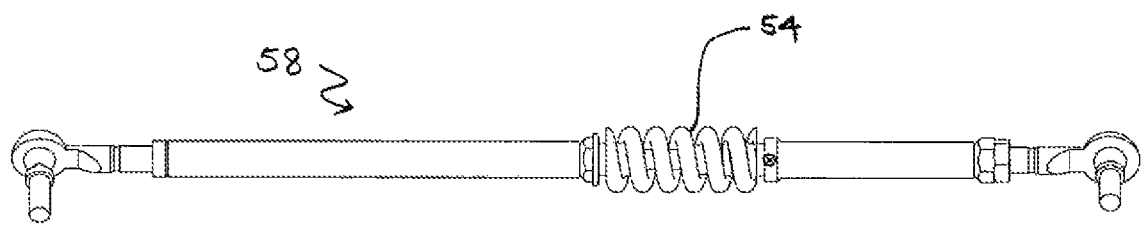
FIG. 6B illustrates linkage element of FIG. 6A in an extended state.

Referring to FIGS. 6A and 6B, the extendible linkage element 58 is telescopic and has a biasing means 54 in form of a spring mounted on it. The linkage element 58 is contracted in its stationary state by the biasing means 54 acting on the linkage element 58. This is the shortest length of the linkage element 58. When a pull force greater than the spring force of the biasing means 54 is applied on both the ends of the linkage element 58, the linkage element 58 extends telescopically.

When moving the ladder 12 between the deployed position 14 and the retracted position 16, the linkage element 58 acts as a fixed link and does not telescopically extend. The biasing means 54 acts on the linkage element 58 to prevent the linkage element 58 from extending when the ladder is being moved between the deployed position 14 and the retracted position 16. As explained below, the linkage element 58 extends telescopically to assist locking the ladder in the retracted position 16.

Referring to FIG. 4A to 4D, when the ladder 12 reaches its retracted position 16, the stop member 18 hits against a fixed member 17 on the mount 102 preventing the ladder 12 from rotating further. Restricting movement of the ladder 12 in a direction away from the deployed position 14, restricts counter-clockwise rotation of the pivot 20 and the pivot arm 62. The ladder 12 is no longer able to move in the direction away from the deployed position 14, and the pivot arm 62 is no longer able to rotate in the counter-clockwise direction.

Referring to FIG. 5A to 5D, in the retracted position 16, when a force greater than the spring force of the biasing means 54 is applied by the hydraulic ram 60 to the rotatable arm 52, the linkage element 58 extends telescopically as the end of the linkage arm 58 attached to the pivot arm 62 is securely held by the fixated pivot arm 62. The extension of the linkage element 58 allows the rotatable arm 52 to rotate further in a counter-clockwise direction until the rotatable arm 52 comes in contact with a portion of the ladder 12. The contacting portion of the ladder 12 being the stop member 18. This is a retracted secured position 30 of the ladder 12.

The rotatable arm 52 acts as the locking means 52 when the rotatable arm 52 is in the travel path of the ladder 12. In the retracted secured position 30, the ladder 12 is restricted from moving in a direction: away from the deployed position 14 by the engagement of the stop member 18 with a fixed member 17 on the mount 102, and towards the deployed position 14 by the engagement of the locking means 52 with the stop member 18 attached to the ladder 12.

In the retracted secured position 30, the locking means 52 is in the operative position that is the locking means 52 is in the path of travel of the ladder 12. Therefore movement of the ladder 12 is restrained by the locking means 52 when the ladder 12 is moved in a direction towards the deployed position 14. Thereby the 'bounce' of the ladder 12 when the equipment 100 travels over a rough surface is reduced or prevented.

The shape of an edge of the locking means 52 is complementary to the shape of the edge of the stop member 18. The complementary edges of the locking means 52 and the stop member 18 engage in the retracted secured position 30. In the embodiment, the shape of both edges is flat.

The stop member 18 and the rotatable arm 52 move synchronously when the ladder 12 is being moved between the deployed position 14 and the retracted position 16. The rotatable arm 52 does not obstruct the movement of the ladder 12 between the deployed position 14 and the retracted position 16. The rotatable arm/locking means 52 obstructs the path of the portion 18 only when the rotatable arm 52 is rotated beyond the limit of the pivoting movement of the ladder 12 in a direction away from the deployed position.

In order to return from the retracted secured position 30 to the retracted position 16, the hydraulic ram 60 is retracted to rotate the locking means 52 in a clockwise direction such that the locking means 52 is no longer obstructing the path of travel of the ladder 12. The retraction of the hydraulic ram 60 causes the linkage element 58 to telescopically contract by removing the force acting against the biasing means 54.

In the retracted position 16 of the ladder 12, the locking means 52 is in its inoperative position wherein the locking means 52 does not obstruct the path of the ladder 12. The ladder 12 is moveable towards the deployed position 14.

To move the ladder 12 to the deployed position 14, the hydraulic ram 60 is further retracted whereby the rotatable arm 52 rotates in a clockwise direction to push the linkage element 58 in order to rotate the pivot arm 62 and the pivot 20 in a clockwise direction. Rotation of the pivot 20 moves the ladder 12 from the retracted position 16 to the deployed position 14.

Figure 7A:
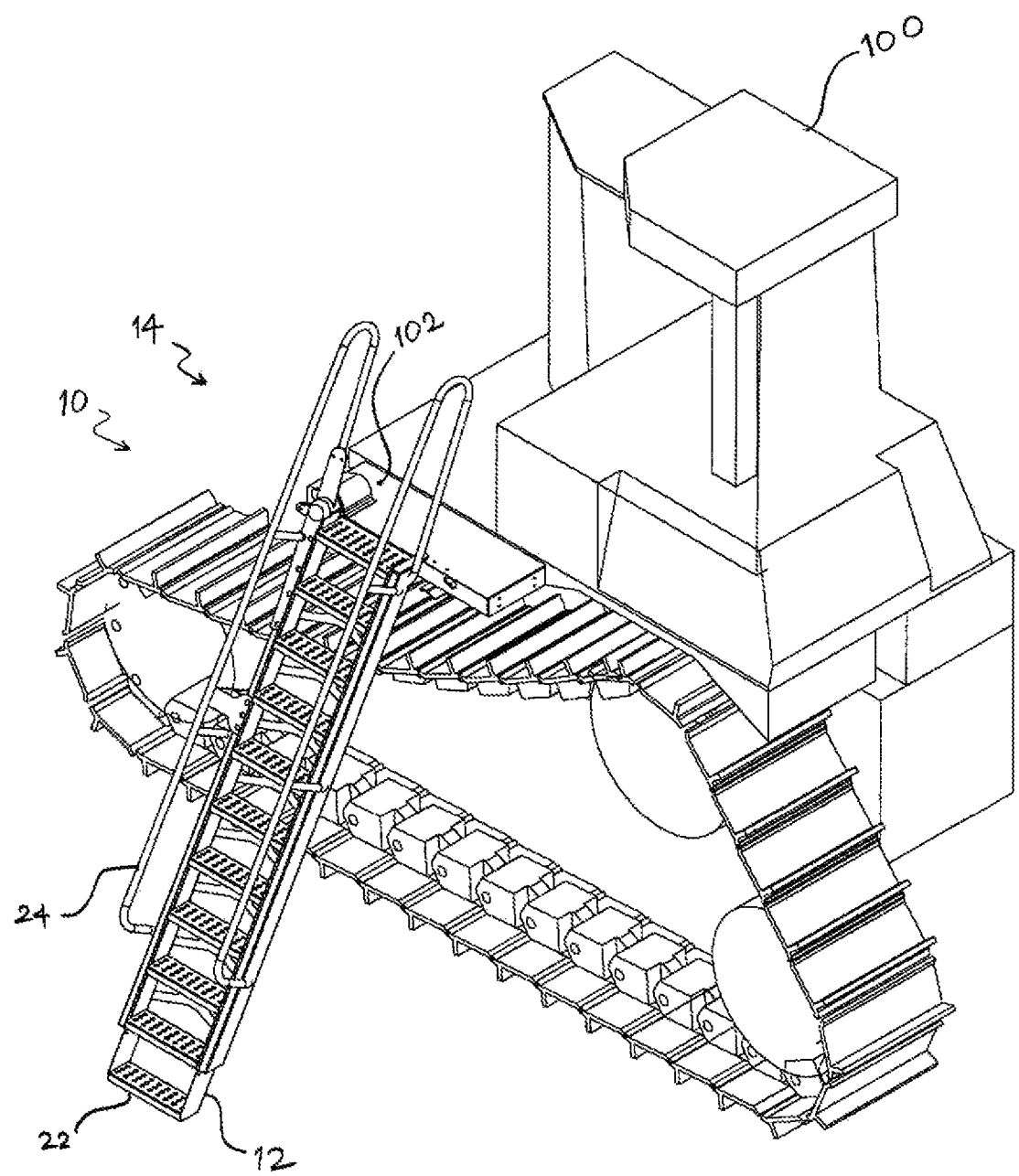
FIG. 7A illustrates an access system in a deployed position attached to an earth moving equipment according to one embodiment of the present invention.

Referring to FIG. 7A, the access system 10 in a deployed position 14 allows a person to travel from ground level to an elevated level. A person may climb up the ladder 12 using the steps 22 and handrails 24. The mount 102 acts as a platform ahead of the final step, adding to the safety of the access system 10.

Figure 7B:
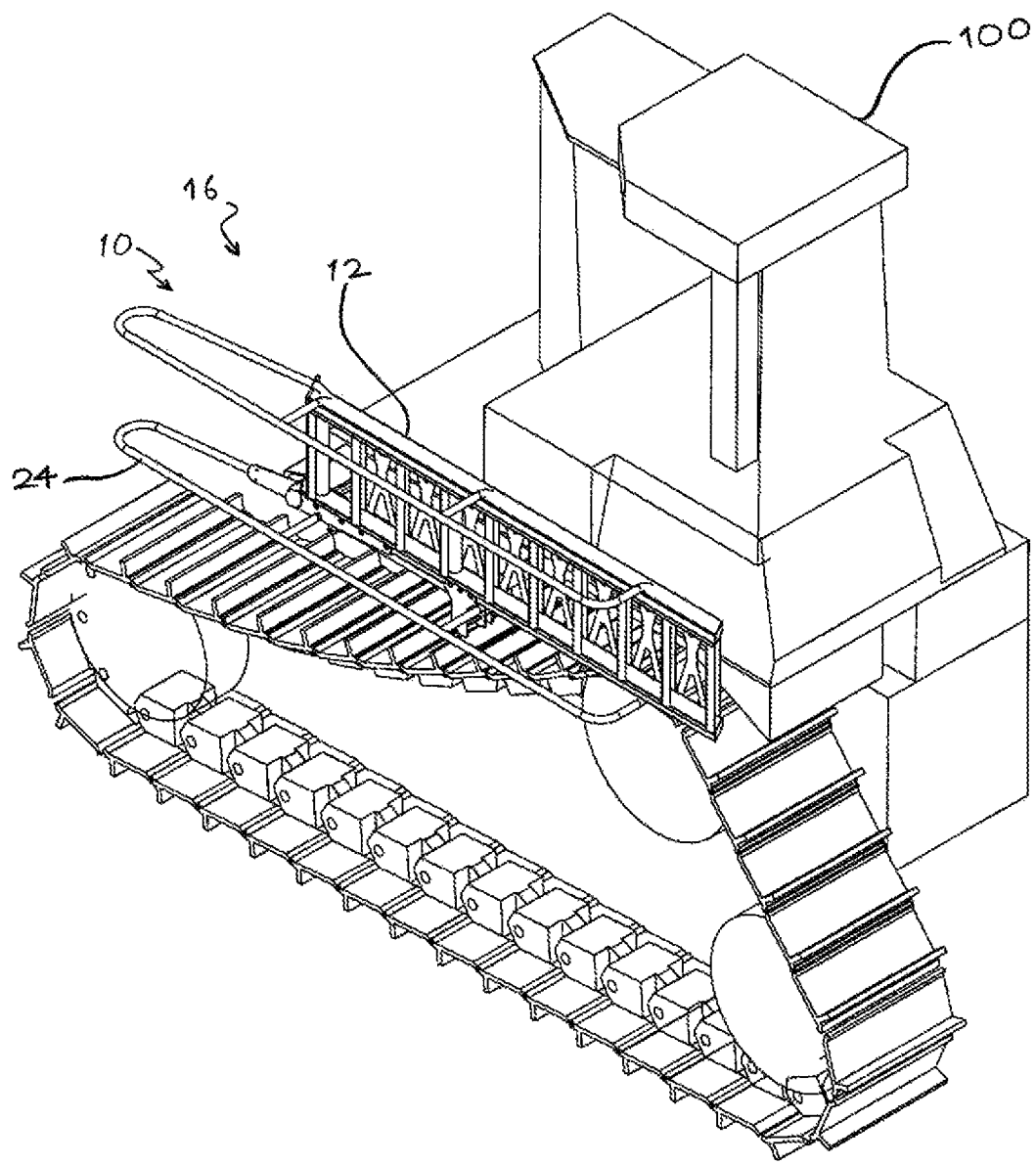
FIG. 7B illustrates an access system in a retracted position attached to an earth moving equipment according to one embodiment of the present invention.

Referring to FIG. 7B, the access system 10 in a retracted position 16 is safely stowed alongside the earth moving equipment 100. The ladder 12 in the retracted position 16 acts as a barrier to the driver's cabin. The locking means 52 is in its operative position to restrain movement of the ladder 12 in order to reduce or prevent bounce when the earth moving equipment 100 is moving.

According to at least one alternative embodiment of the present invention, the hydraulic ram 50 as a prime mover may be replaced by mechanical, electrical or pneumatic means to rotate the rotatable arm 52.

The biasing means 54 and linkage element 58 may be replaced by a gas strut, hydraulic cylinder or an electrical solenoid.

The stop member 18 may be attached to the mount 102 or the equipment 100 in order to restrict movement of the ladder 12 in a direction away from the deployed position 14.

The stop member 18 which engages with a fixed member 17 on the mount 102 and a portion of the ladder 12 which engages with the locking means 52 may be two separate parts.

The shape of the complementary edges of the locking means 52 and the stop member 18 may be varied to vary the locking strength.

The locking means 52 and the stop member 18 may be fitted with friction pads to strengthen their engagement and reduce noise.

REFERENCE NUMBER TABLE

| No. | Feature |
| --- | --- |
| 10 | Access system |
| 12 | Access means/Ladder |
| 14 | Deployed position |
| 16 | Retracted position |
| 18 | Stop member |
| 20 | Pivot |
| 22 | Steps |
| 24 | Handrails |
| 30 | Retracted secured position |
| 50 | Retraction mechanism |
| 52 | Locking means/rotatable arm |
| 54 | Biasing means |
| 58 | Linkage element |
| 60 | Hydraulic ram |
| 62 | Pivot arm |
| 100 | Earth moving equipment |
| 102 | Mount |

The claims defining the invention are as follows:

1. An access system for earth moving equipment to allow a person to travel from ground level to an elevated position, said access system including:
   a stair or ladder mounted by a pivot to the earth moving equipment for, in use, access to or from the earth moving equipment when the stair or ladder is in a deployed position, and
   a retraction mechanism configured to retract the stair or ladder from the deployed position, wherein a person can ascend or descend on the stair or ladder, to a retracted position, wherein the stair or ladder is stowed, the retraction mechanism including an extendible linkage element configured to transfer a retraction force from an actuator, the access system having the actuator operatively connected to the stair or ladder to cause the stair or ladder to rotate about an axis of the pivot for retraction of the stair or ladder, and
   wherein the extendible linkage element is extendible in length and includes a biasing device configured to resist said extension of the extendible linkage element, and the extendible linkage element is configured to extend in length to allow the actuator to actuate a locking arrangement to lock the stair or ladder in the retracted position.

2. An access system according to claim 1, wherein the locking arrangement in a locked position is configured to restrain movement of the stair or ladder from moving in a direction towards the deployed position.

3. An access system according to claim 1, wherein the locking arrangement is included in the retraction mechanism.

4. An access system according to claim 1, wherein the locking arrangement engages with the stair or ladder in order to restrain movement of the stair or ladder.

5. An access system according to claim 1, wherein the extendible linkage element is configured to extend in order to allow the locking arrangement to move to a locking position.

6. An access system according to claim 1, wherein the biasing device acts to contract the extendible linkage element by holding portions of the extendible linkage element together relative to one another.

7. An access system according to claim 1, wherein the locking arrangement is a rotatable arm connected via the linkage element to a pivot arm attached to the stair or ladder such that rotating the rotatable arm moves the stair or ladder between the deployed position and the retracted position.

8. An access system according to claim 7, wherein the extendible linkage element extends when the locking arrangement moves to the locking position and when the rotatable arm is further rotated after the stair or ladder reaches the retracted position.

9. An access system according to claim 7, wherein the rotatable arm is configured to be rotated by the actuator.

10. An access system according to claim 9, wherein the actuator is a hydraulic ram.

11. An access system according to claim 1, including a stop member attached to the stair or ladder, wherein the stop member engages with a fixed member mounted on the earth moving equipment.

12. An access system according to claim 1, wherein the extendible linkage element is telescopic.

13. An access system according to claim 1, wherein a length that the extendible linkage element can be extended to is resisted by the biasing device which is a spring.

14. An access system for an earth moving equipment to allow a person to travel from ground level to an elevated position, said access system including:
- a stair or ladder mountable on to the earth moving equipment, and
- a retraction mechanism configured to retract the stair or ladder from a deployed position wherein a person can ascend or descend on the stair or ladder to a retracted position wherein the stair or ladder is stowed, and the retraction mechanism including an extendible linkage element configured to transfer motion from an actuator to the stair or ladder, and wherein the extendible linkage element is connected to a locking means for restraining movement of the stair or ladder when in the retracted position, wherein the extendible linkage element is configured to extend in length against a retracting force of a biasing means to allow the locking means to move to a locking position.

15. An access system according to claim 14, wherein the locking means is configured to restrain movement of the stair or ladder from moving in a direction towards the deployed position.

16. An access system according to claim 14, wherein the locking means is configured to move to a release position to allow the stair or ladder to move from the retracted position in a direction towards the deployed position.

17. An access system according to claim 14, wherein the locking means is configured to engage with the stair or ladder in order to restrain movement of the stair or ladder.

18. An access system according to claim 14, the biasing means including a spring configured to resist extension of the extendible linkage element.

19. An access system according to claim 14, wherein the retraction mechanism has a rotatable arm connected via the extendible linkage element to a pivot arm connected to the stair or ladder.

20. An access system according to claim 19, wherein the extendible linkage element extends when the locking means moves to the locking position and when the rotatable arm is further rotated after the stair or ladder reaches the retracted position.

21. An access system according to claim 19, wherein the rotatable arm is configured to be rotated by an actuator.

22. An access system according to claim 21, wherein the actuator is a hydraulic ram.

23. An access system according to claim 14, including a stop member attached to the stair or ladder, wherein the stop member engages with a fixed member mounted on the earth moving equipment.

24. An access system according to claim 14, wherein the extendible linkage element is telescopic.

25. An access system according to claim 14, wherein a length that the extendible linkage element can be extended to is resisted by the biasing means which is a spring.

26. An access system for an earth moving equipment to allow a person to travel from ground level to an elevated position, said access system including:
- a stair or ladder mountable on to the earth moving equipment for, in use, access to or from the earth moving equipment when the stair or ladder is in a deployed position, and a retraction mechanism configured to retract the stair or ladder from the deployed position, wherein a person can ascend or descend on the stair or ladder, to a retracted position wherein the stair or ladder is stowed, the retraction mechanism including an extendible linkage element configured to transfer a retraction force from an actuator to the stair or ladder to pivot the stair or ladder about a pivot axis, wherein the extendible linkage element is extendible in length, the access system including the actuator and a biasing means, the extendible linkage element is configured to reduce in length under influence of the biasing means configured to resist said extension of the extendible linkage element and configured to ensure release of a locking arrangement operatively connected to the actuator to allow the stair or ladder to deploy from the retracted position.

* * * * *